(12) United States Patent
Poletti (10) Patent No.: US 11,668,871 B2
(45) Date of Patent: Jun. 6, 2023

(54) ANTIRESONANT HOLLOW CORE FIBRE, PREFORM THEREFOR AND METHOD OF FABRICATION

(71) Applicant: University of Southampton, Southampton (GB)

(72) Inventor: Francesco Poletti, Southampton (GB)

(73) Assignee: University of Southampton

( * ) Notice: Subject to any disclaimer, the term of this patent is extended or adjusted under 35 U.S.C. 154(b) by 0 days.

(21) Appl. No.: 17/441,886

(22) PCT Filed: Apr. 22, 2020

(86) PCT No.: PCT/GB2020/050998
§ 371 (c)(1),
(2) Date: Sep. 22, 2021

(87) PCT Pub. No.: WO2020/217052
PCT Pub. Date: Oct. 29, 2020

(65) Prior Publication Data
US 2022/0196907 A1 Jun. 23, 2022

(30) Foreign Application Priority Data
Apr. 24, 2019 (GB) .................................. 1905726

(51) Int. Cl.
*G02B 6/02* (2006.01)
*B29D 11/00* (2006.01)
(Continued)

(52) U.S. Cl.
CPC .... *G02B 6/02304* (2013.01); *B29D 11/00721* (2013.01); *C03B 23/076* (2013.01);
(Continued)

(58) Field of Classification Search
CPC ............ G02B 6/02304; G02B 6/02328; B29D 11/00721; B29D 11/00663; C03B 23/076;
(Continued)

(56) References Cited

U.S. PATENT DOCUMENTS 7,155,097 B2 * 12/2006 Jakobsen ........... G02B 6/02328
385/127
7,366,388 B2    4/2008 Roberts et al.
(Continued)

FOREIGN PATENT DOCUMENTS

CN          102781859 A     11/2012
GB            2518420 A      3/2015
(Continued)

OTHER PUBLICATIONS

Search Report dated Feb. 25, 2020 in corresponding United Kingdom Application No. GB1905726.4.
(Continued)

*Primary Examiner* — Andrew Jordan (57) ABSTRACT

A shaped tube (50,51) for use as a component in the fabrication of an antiresonant hollow core optical fibre, the shaped tube having a side wall with a transverse cross-sectional shape comprising a number of major curved portions (52) alternating with the same number of minor substantially straight portions (54), each curved portion (52) having an inwardly curving shape, and each straight portion (54) being equidistant from a central longitudinal axis of the shaped tube (50,51).

21 Claims, 5 Drawing Sheets

(51) Int. Cl.
  *C03B 23/07* (2006.01)
  *C03B 37/012* (2006.01)
  *C03B 37/027* (2006.01)

(52) U.S. Cl.
  CPC .. *C03B 37/01211* (2013.01); *C03B 37/02781* (2013.01); *G02B 6/02328* (2013.01)

(58) Field of Classification Search
  CPC ......... C03B 37/01211; C03B 37/02781; C03B 37/0122; C03B 37/01225; C03B 37/01274; C03B 37/01493; C03B 37/01208; C03B 2203/14; C03B 2203/16; C03B 2203/42; C03B 19/00
  See application file for complete search history.

(56) References Cited

U.S. PATENT DOCUMENTS

| | | | | |
|---|---|---|---|---|
| 8,571,371 | B2* | 10/2013 | Gibson | C03B 37/01274 385/125 |
| 9,810,837 | B2* | 11/2017 | Benabid | G02B 6/02347 |
| 11,215,751 | B2* | 1/2022 | Poletti | C03B 37/0122 |
| 2004/0179796 | A1* | 9/2004 | Jakobsen | G02B 6/02361 385/123 |
| 2005/0185908 | A1* | 8/2005 | Roberts | C03B 37/016 385/125 |
| 2005/0232560 | A1 | 10/2005 | Knight et al. | |
| 2012/0321263 | A1* | 12/2012 | Gibson | C03C 3/321 65/393 |
| 2013/0000821 | A1 | 1/2013 | Chamorovskiy et al. | |
| 2016/0124144 | A1 | 5/2016 | Benabid et al. | |
| 2017/0160467 | A1* | 6/2017 | Poletti | G02B 6/02328 |
| 2019/0101695 | A1* | 4/2019 | Poletti | H01S 3/06712 |
| 2020/0156987 | A1* | 5/2020 | Wheeler | G02B 6/02357 |
| 2020/0278491 | A1* | 9/2020 | Poletti | G02B 6/02328 |
| 2022/0011502 | A1* | 1/2022 | Poletti | G02B 6/255 |
| 2022/0196907 | A1* | 6/2022 | Poletti | C03B 37/01211 |
| 2022/0242773 | A1* | 8/2022 | Rosenberger | C03B 37/0122 |
| 2022/0244453 | A1* | 8/2022 | Rosenberger | C03B 37/0124 |
| 2022/0267192 | A1* | 8/2022 | Rosenberger | C03B 37/0122 |
| 2022/0267193 | A1* | 8/2022 | Rosenberger | C03B 37/02781 |
| 2022/0291443 | A1* | 9/2022 | Rosenberger | G02B 6/02328 |
| 2022/0356108 | A1* | 11/2022 | Rosenberger | C03B 37/02781 |
| 2022/0357506 | A1* | 11/2022 | Rosenberger | C03B 37/01245 |
| 2022/0363584 | A1* | 11/2022 | Rosenberger | C03B 37/0124 |

FOREIGN PATENT DOCUMENTS

| | | |
|---|---|---|
| GB | 2526879 A | 9/2015 |
| GB | 2566466 A | 3/2019 |
| JP | 2011219339 A | 11/2011 |
| WO | 02072489 A2 | 9/2002 |
| WO | 2015185761 A1 | 10/2015 |
| WO | 2019008352 A1 | 10/2019 |

OTHER PUBLICATIONS

International Search Report and Written Opinion dated Jul. 7, 2020 in corresponding International Application No. PCT/GB2020/050998.
Kosolapov et al., "Hollow-core revolver fibre with a double-capillary reflective cladding", Quantum Electronics., vol. 46, No. 3, Mar. 29, 2016 (Mar. 29, 2016), pp. 267-270.
Bradley, et al., "Record Low-Loss 1.3dB/km Data Transmitting Antiresonant Hollow Core Fibre," in Proc European Conference on Optical Communications (ECOC) 2018, paper Th3F2.
Francesco Poletti, "Nested antiresonant nodeless hollow core fiber," Opt. Express 22, 23807-23828 (2014).
L. D. van Putten et al., "Exploring the Effect of the Core Boundary Curvature in Hollow Antiresonant Fibers," IEEE Photonics Technology Letters 29(2), 263-266, (2017).
"Office Action and Search Report Issued in Chinese Patent Application No. 202080029972.7", dated Mar. 1, 2023, 12 Pages.
"Office Action Issued in United Kingdom Patent Application No. 1905726.4", dated Mar. 29, 2023, 4 Pages.

* cited by examiner

ANTIRESONANT HOLLOW CORE FIBRE, PREFORM THEREFOR AND METHOD OF FABRICATION

This application is a national phase of International Application No. PCT/GB2020/050998 filed Apr. 22, 2020, which claims priority to United Kingdom Application No. 1905726.4 filed Apr. 24, 2019, the entire disclosures of which are hereby incorporated by reference.

BACKGROUND OF THE INVENTION

The present invention relates to antiresonant hollow core optical fibres, preforms for such fibres, and method of fabricating the preforms.

Classes of optical fibre include hollow core fibres, in which light is guided along a longitudinal hollow void forming the core of the fibre by an optical guidance mechanism enabled by the presence of a structured arrangement of longitudinal voids or capillaries forming a cladding surrounding the core void. Various configurations for the cladding are known, producing different guidance effects.

One type of hollow core fibre is the antiresonant hollow core fibre (ARF). Fibres of this type have a relatively simple cladding structure, comprising a typically relatively small number of glass tubes or capillaries arranged in a ring around a central core void, and secured to the inner surface of a jacket tube to maintain the required geometry. This arrangement does not offer any high degree of periodicity so guidance cannot operate via photonic bandgap effects such in hollow core photonic bandgap (crystal) fibres. Instead, antiresonance is provided for propagating wavelengths that are not resonant with a wall thickness of the cladding capillaries; in other words, for wavelengths in an antiresonance window which is defined by the cladding capillary wall thickness. The antiresonance acts to inhibit coupling between air-guided optical modes supported by the core and any optical modes which the cladding may support, so light is confined to the core and can propagate at low loss by an antiresonant optical guidance effect.

At its simplest, an ARF can comprise a single ring of cladding capillaries, but several modifications and variations of this arrangement have been proposed in order to enhance performance in areas such as bandwidth and loss. Many applications known for conventional solid core optical fibres have been demonstrated with hollow core fibres, including telecommunications, optical power delivery and optical sensing. For telecommunications uses in particular, low optical loss (being the fraction of propagating light lost per unit length of propagation, typically per kilometre) is critical.

The lowest loss reported to date for a hollow core fibre is 1.3 dB/km, achieved in an ARF with a nested antiresonant nodeless fibre (NANF) configuration [1]. A NANF comprises a ring of spaced-apart (non-contacting) nested capillaries (one or more smaller capillaries fixed inside a large capillary) secured within an outer jacket and surrounding a central hollow core region. As with ARFs in general, the main optical guidance mechanism is a combination of antiresonance from uniform thickness of the glass walls or membranes of the cladding capillaries, and inhibited coupling to modes in the cladding. NANFs are predicted to be able to offer significantly better loss performance than the already impressive results mentioned above, and may one day even overcome the fundamental loss limit of all-solid silica fibres [2].

In such an event, high volume production of NANF would be required in order to supply demand. Current fabrication methods are expensive and slow, and therefore unsuitable for mass production. Accordingly, improved methods for NANF manufacture are of significant interest.

SUMMARY OF THE INVENTION

Aspects and embodiments are set out in the appended claims.

According to a first aspect of certain embodiments described herein, there is provided a shaped tube for use as a component in the fabrication of an antiresonant hollow core optical fibre, the shaped tube having a side wall with a transverse cross-sectional shape comprising a number of major curved portions alternating with the same number of minor substantially straight portions, each curved portion having an inwardly curving shape, and each straight portion being equidistant from a central longitudinal axis of the shaped tube.

According to a second aspect of certain embodiments described herein, there is provided a preform for an antiresonant hollow core optical fibre, comprising a shaped tube according to the first aspect secured inside an outer jacket tube of glass material or polymer material such that the straight portions of the shaped tube are in contact or near-contact with an inner surface of the outer jacket tube.

According to a third aspect of certain embodiments described herein, there is provided a cane for an antiresonant hollow core optical fibre drawn from a preform according to the second aspect.

According to a fourth aspect of certain embodiments described herein, there is provided an antiresonant hollow core optical fibre drawn from a preform according to the first aspect, or from a cane according to the second aspect.

According to a fifth aspect of certain embodiments described herein, there is provided a method of fabricating a preform for an antiresonant hollow core optical fibre comprising: providing a shaped tube according to the first aspect; inserting the shaped tube into an outer jacket tube of glass material or polymer material such that there is contact or near-contact between the straight portions of the shaped tube and an inner surface of the outer jacket tube; and securing the shaped tube inside the outer jacket tube.

According to a sixth aspect of certain embodiments described herein, there is provided a method of fabricating a cane for an antiresonant hollow core optical fibre, comprising fabricating a preform according to the method of the fifth aspect, and drawing the preform into a cane.

According to a seventh aspect of certain embodiments described herein, there is provided a method of fabricating an antiresonant hollow core optical fibre, comprising fabricating a preform according to the method of the fifth aspect or fabricating a cane according to the sixth aspect, and drawing the preform or the cane into an optical fibre.

According to an eighth aspect of the certain embodiment described herein, there is provided a nested antiresonant nodeless hollow core optical fibre, or a preform or a cane for drawing into a nested antiresonant nodeless hollow core optical fibre, comprising: a cylindrical elongate outer jacket of glass material or polymer material a cladding structure comprising a plurality of cladding elements of glass material or polymer material spaced apart around an inner surface of the outer jacket and defining elongate cladding voids, each cladding element comprising a first inwardly curving wall extending from the inner surface towards a central longitudinal axis of the outer jacket and back to the inner surface along a first curved shape, and a second inwardly curving wall extending from the inner surface towards the central longitudinal axis and back to the inner surface along a second curved shape which has a different shape and/or a different length from the first curved shape; and an elongate hollow core region along the central longitudinal axis and bounded by negative curvatures of the first inwardly curving walls of the cladding elements.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, methods, devices and apparatus may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of devices, methods and apparatus discussed herein which are not described in detail may be implemented in accordance with any conventional techniques for implementing such aspects and features.

The type of hollow core optical fibre that can be described as antiresonant hollow core fibre (ARF) at its simplest comprises a tubular outer jacket, and a number of cladding capillaries arranged in a ring inside the jacket, and secured or bonded to the inner surface of the jacket. A central void within the ring of capillaries forms a hollow core along which one or more optical modes can be guided by an antiresonant waveguiding effect.

Figure 1:
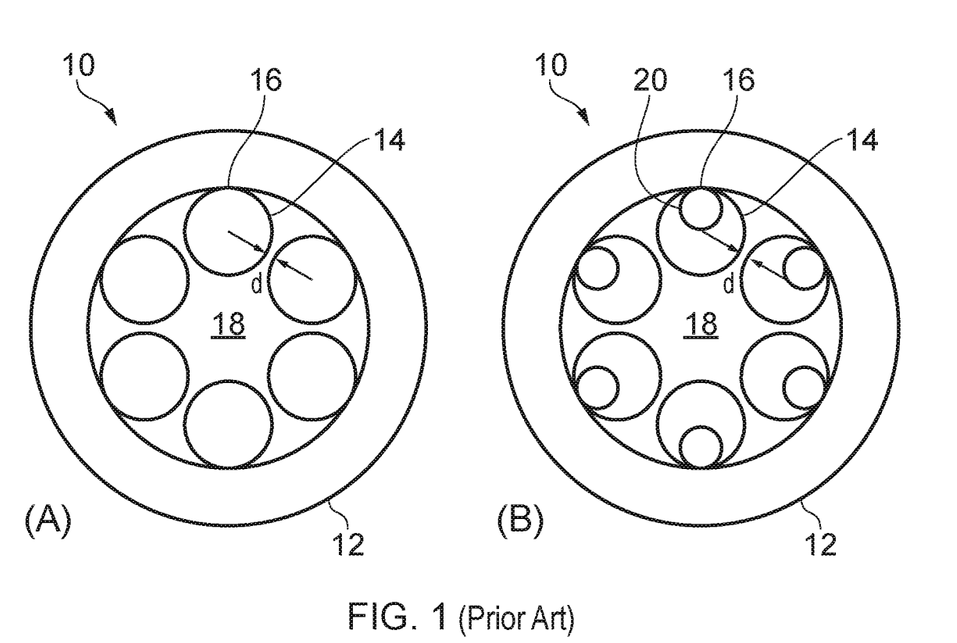
FIGS. 1(A), 1(B) and 2 show schematic transverse cross-sectional views of antiresonant hollow core fibres, including cladding features from three known fibre designs.

FIG. 1(A) shows a transverse cross-sectional view of a first previously-proposed antiresonant hollow core fibre. The view shows a transverse cross-sectional view through a fibre with a circular cross-section. The fibre 10 has an outer tubular jacket 12. A plurality of tubular or hollow cladding capillaries or cells 14, in this example six capillaries of the same circular cross-sectional size and shape, are arranged inside the jacket 12 in a ring, so that the longitudinal axes of each cladding capillary 14 and of the jacket 12 are substantially parallel. The cladding capillaries define elongate holes, lumen or cavities which run continuously along the length of the optical fibre. The number of capillaries allows this structure to be labelled as a 6 cell ARF. The cladding capillaries or tubes 14 are each in contact with (bonded to) the inner surface of the jacket 12 at a location 16, such that the cladding capillaries 14 are evenly spaced around the inner circumference of the jacket 12, and are also spaced apart from each other by a gap or spacing d (there is no contact between neighbouring capillaries). The cladding structure is limited to these cladding capillaries only. In some designs of ARF, the cladding tubes 14 may be positioned around the ring so that adjacent tubes are in contact with each other (in other words, not spaced apart as in FIG. 1(A)), but spacing to remove this contact can improve the fibre's optical performance. The spacing eliminates optical nodes that arise at contact points between touching adjacent tubes and which tend to cause undesirable resonances that result in high losses. Accordingly, fibres with spaced-apart cladding capillaries as in FIG. 1(A) may be referred to as "nodeless" antiresonant hollow core fibres.

The arrangement of the cladding capillaries 14 in a ring around the inside of the jacket 12 creates a central space, cavity or void within the fibre 10, also with its longitudinal axis parallel to those of the jacket 12 and capillaries 14, which is the fibre's hollow core 18, also extending continuously along the fibre's length. The core 18 is bounded by the inwardly facing parts of the outer surfaces of the cladding capillaries 14. This is the core boundary, and the material (glass or polymer, for example) of the capillary walls that make up this boundary provides the required antiresonance optical guidance effect or mechanism. The core boundary has a shape comprising a series of adjacent inwardly curving surfaces (that is, convex from the point of view of the core). This contrasts with the usual outward curvature of the core-cladding interface in a solid-core fibre, and the substantially circular core boundary of a hollow core fibre of the photonic bandgap type. Accordingly, antiresonant hollow core fibres can be described as negative curvature fibres. Mathematically, this can be defined as the surface normal vector of the core boundary being oppositely directed to a radial unit vector (vector along a radius of the transverse cross-section of the fibre). The negative curvature (convex shape) of the core boundary also inhibits coupling between the fundamental core mode and any cladding modes. A negative curvature antiresonant hollow core fibre has a core boundary formed by a convex membrane or wall (typically of glass) with a thickness which is matched to be in antiresonance with the guided optical wavelength.

FIG. 1(B) shows a transverse cross-sectional view of a second previously-proposed antiresonant hollow core fibre [2, 3]. The fibre includes all the features of the FIG. 1(A) example, but the cladding has a more complex structure. Each cladding capillary 14 is a primary capillary, still spaced from its neighbour by a gap d, with a secondary, smaller capillary 20 nested inside it, bonded to the inner surface of the cladding capillary 14 at the same azimuthal position around the jacket 12 as the point of bonding 16 between the primary capillary 14 and the jacket 12. These additional smaller capillaries 20 are included with the aim of reducing the optical loss in the fibre. The provision of a second air-glass boundary in the radial direction reduces loss via optical leakage. Additional still smaller tertiary capillaries may be nested inside the secondary capillaries, again bonded in line with the azimuthal contact locations 16. ARF designs of this type, with secondary and optionally further smaller capillaries, may be referred to as "nested antiresonant nodeless fibres", or NANFs. The six primary capillaries of this example allow this structure to be labelled as a 6 cell NANF.

The example cladding structures shown in FIGS. 1(A) and 1(B) comprise six primary cladding capillaries arranged in a ring around the core. ARFs are not so limited however, and may instead comprises five or fewer or seven or more capillaries forming the boundary around the hollow core.

The circular cross-section of the cladding capillaries in ARFs arises from the ready availability of cylindrical glass tubes, which are obtainable from commercial sources in many sizes and types and grades of glass. Consequently, such tubes form the basis of manufacturing techniques for all silica hollow core optical fibres currently in existence.

In the case of ARFs, manufacture requires the fabrication of a preform (in common with fibre production in general) which is assembled manually by highly skilled operators. Individual tubes for the outer jacket and for the cladding capillaries are prepared, and the cladding capillaries are stacked inside the jacket tube possibly with additional tubes or rods to maintain the positions of the capillaries and define a stack of tubes. The assembly is then fused to fix the capillaries in place against the inside surface of the jacket, thereby creating a preform able to be pulled or drawn into an optical fibre. Considerable expertise is required to correctly locate the various tubes and maintain their relative positions during the stages of production to produce the finished fibre. Accordingly, the large scale low cost commercial manufacture of ARFs, including NANFs with their desirable low loss properties, poses considerable difficulties.

While the circularly-based structure of ARFs is conventional, it is not essential for high quality optical performance of these fibres. Rather, the light guiding properties arise from the negative curvature of the core boundary noted above, and similar performance can be obtained from non-circular cladding elements that nevertheless define a suitably shaped core boundary.

Figures 2, 3:
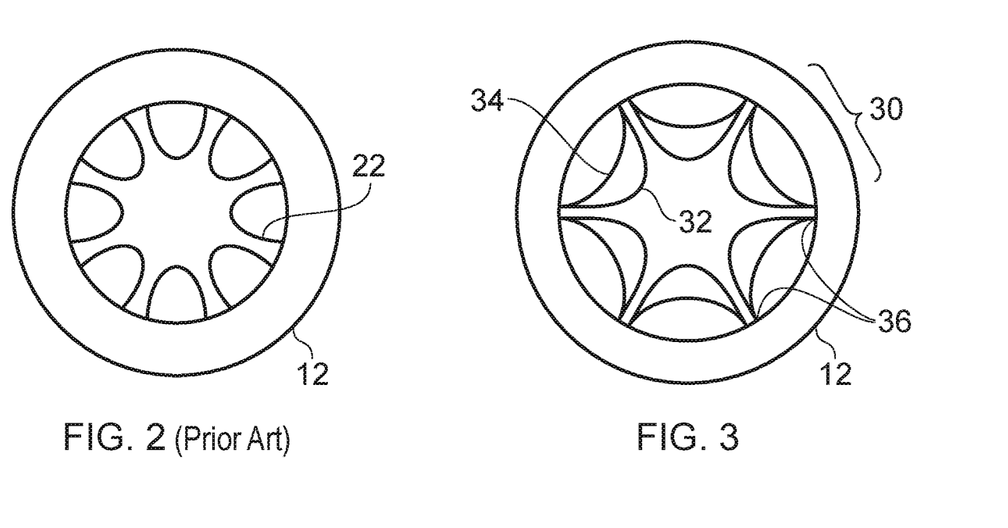
FIG. 3 shows a transverse cross-sectional view of an antiresonant hollow core fibre according to an embodiment.

FIG. 2 shows a transverse cross-sectional view of a third previously proposed antiresonant hollow core fibre [4]. The longitudinal voids of the cladding are defined by a plurality (in this case eight) of semi-elliptical cladding elements 22 secured to the inside surface of the outer jacket 12 in a spaced-apart arrangement as in the earlier examples. This structure is one of several proposed in a study into the effect of curvature of the core boundary, in which differing degrees of ellipticity and numbers of cladding elements were modelled. Good optical performance in terms of light guiding ability and low loss were found, indicating that circular cladding capillaries are in no way essential for ARFs. Also, the semi-elliptical elements may have some benefit in each having two anchor points with the outer jacket, compared to one for circular elements. This would offer increased structural stability during manufacture, so that accurate positioning of the cladding elements may be achieved more easily. However, two anchor points per cladding element clearly increases the amount of element fusing that needs to be done when making a preform.

The present disclosure proposes that the use of non-circular cladding elements is also applicable to NANF-like ARFs, where there are two or more negative curvature glass cladding walls provided along a radial direction.

FIG. 3 shows a transverse cross-sectional view of an example NANF-like ARF. If the nested capillary tubes of the FIG. 1(B) example were each cut open longitudinally at the point where they are in contact with each other and fixed to the jacket, the tubes could be opened up by moving the two edges of the cut away from one another. This would create a double-walled curved element 30 comprising a first curved element 32 and a second curved element 34 with commonly located end points 36, and each with a curved shape and different degree of curvature. The elements 32 could then be attached inside an outer jacket 12 along each of the cut edges, in a spaced apart arrangement as in a regular NANF. This would produce the structure of FIG. 3. The features of the double air-glass boundaries with negative curvature and the gaps between adjacent cladding elements present in a regular NANF are preserved, however, so one can predict that the fibre will be able to maintain exceptional properties of ultralow optical loss, wide optical bandwidth, and ultralow overlap of the optical mode with the glass walls.

Figure 4A:
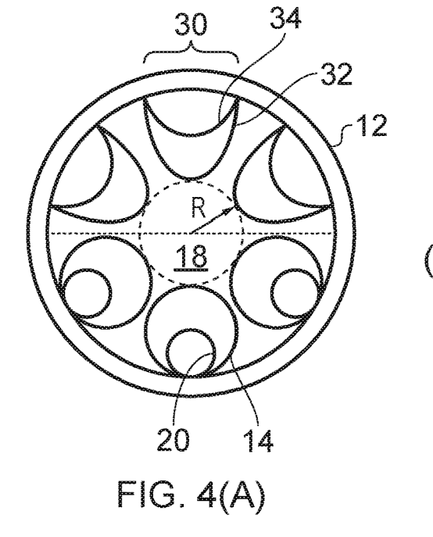
FIG. 4(A) shows a comparison of transverse cross-sectional partial views of a known antiresonant hollow core fibre design and an antiresonant hollow core fibre design according to embodiment.

FIG. 4(A) shows a transverse cross-sectional view of example NANF fibre structures, in which the lower half of the figure shows a regular 6-cell NANF arrangement with primary and secondary nested capillaries 14, 20 such as that of FIG. 1(B). The upper half shows a NANF-like arrangement with double-walled curved cladding elements 30 similar to those in the example of FIG. 3. In this case, the first curved element 32, which is located adjacent to the core 18 to define the core boundary and corresponds to the primary capillary in the regular NANF, has a semi-elliptical shape. The second curved element 34, which corresponds to the secondary capillary in the regular NANF, has a semi-elliptical shape with a lower aspect ratio/ellipticity than the first curved element. Hence a capillary void, lumen or cavity is defined between the first curved element 32 and the second curved element 34, and another between the second curved element 34 and the jacket 12. These curved shapes are examples only however, and other curved shapes may be used. Fibres structured in this way were modelled by computer simulation. For the purposes of comparison, the two modelled fibres had the same core radius R of 30 µm (indicated in FIG. 4(A)) and the same thickness of glass wall or membrane for the capillary elements, being 0.55 µm.

Figure 4B:
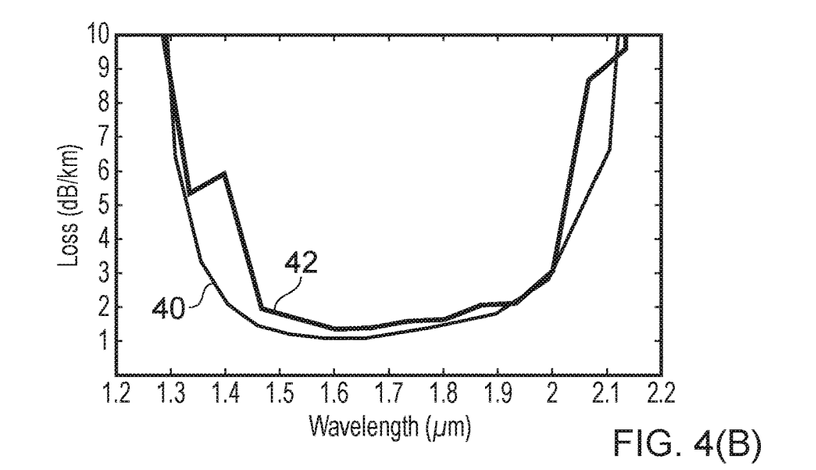
FIG. 4(B) shows a graph of results of optical loss simulations for the fibre designs of FIG. 4(A)

FIG. 4(B) shows graphs of the results of modelling the optical loss due to leakage of optical power away from the guided mode in the core, as a function of guided wavelength. As can be seen, the fibres have a bandwidth from about 1.3 µm to about 2.1 µm, meaning that they can guide light with a wavelength in this range with low loss. Curve 40 shows the loss of the regular NANF, and curve 42 shows the loss of the semi-elliptical element NANF-like arrangement. As can be readily appreciated, the loss of the two structures is very similar, and also very low (less than 2 dB/km over the central portion of the bandwidth). Hence, the NANF-like fibre having semi-elliptical cladding elements in place of circular cladding elements is a useful structure for an ARF.

However, in the context of known ARF manufacturing techniques based on stacking cylindrical tubes, fusing the tubes together at contact points and drawing the resulting preform into a fibre, there is seemingly no straightforward way to fabricate ARFs structured with double-walled curved cladding elements, or even the single walled curved cladding elements of the FIG. 2 structure.

For example, US 2016/0124144 [5] describes a photonic crystal hollow core fibre in which the core boundary is formed from a series of adjacent arcs to provide a similar shape as that available from curved cladding elements, but which is formed by conventional stacking and drawing of circular cross-section capillaries.

The present disclosure proposes an approach for fabricating ARFs with curved, non-circular cladding elements such as those shown in FIGS. 2, 3 and 4(A), which can be greatly simplified compared to conventional ARF fabrication based on cylindrical tubes, while nonetheless producing fibres of at least comparable optical performance.

The approach proposes the use of shaped elongate tubes that each define a plurality of spaced-apart curved cladding elements in a circumferential configuration. A tube, or two or more tubes defining differently shaped cladding elements, can be inserted directly into an appropriately sized outer jacket tube to make a preform for an ARF. One shaped tube provides a full ring of cladding voids around a hollow core.

FIG. 5(A) shows a transverse cross-sectional view of a first example shaped tube 50. The tube 50 is shaped to provide six curved cladding elements for an ARF, and is therefore intended for the fabrication of a six-cell ARF. The tube 50 has a side wall comprising major curved portions 52 alternated with minor substantially straight portions 54. The terms "major" and "minor" are intended to convey that the curved portions have significantly greater length than the straight portions. All the straight portions 54 have the same size and shape, and all the curved portions 52 have the same size and shape in this example (this is not essential, however, and differences in shape may be utilised to provide more complex cladding structures). Hence, the tube 50 has rotational symmetry about its central longitudinal axis X, in this case six-fold (or six degree), corresponding to the number of curved cladding elements and hence the intended number of cells in the eventual ARF. Note that the tube has the same or substantially the same cross-section along its whole length.

While this example has six curved portions and six intervening straight portions, any number of portions can be included depending on the desired cladding structure for the optical fibre. Hence, a shaped tube may have two, three, four, five, six, seven, eight, nine, ten, eleven, twelve or more curved portions, and a corresponding number of straight portions.

The straight portions 54 are each equally distant from the central longitudinal axis X of the tube 50, and are in effect located at equally spaced intervals around the circumference of a circle centred at X and having a radius equal to the distance from X to each straight portion 54 (hereinafter "the nominal circle"). The straight portions 54 are substantially perpendicular or near-perpendicular to the radius at the relevant location, in other words, following tangents. While the straight portions 54 may be genuinely straight and perpendicular, they may also have some degree of curvature, such as following the circumference of the aforementioned notional circle. This may arise from manufacturing methods in which the shaped tube is created from a circular tube, some examples of which are described in more detail below. They may be considered to be substantially straight since they occupy such a small proportion of the full circumference. The straight portions may also have other shapes than straight or exactly curved along the circumference. Some curvature may allow better fitting against the inside surface of the jacket tube when the preform components are assembled.

The straight portions 54, as noted, are relatively short, occupying a small proportion of the overall circumference of the notional circle. The purpose of the straight portions 54 is to separate each curved portion 52 from its adjacent neighbouring curved portions 52, in order to define the desired spacing between the cladding elements corresponding to the gap d in FIG. 1(A), where the gap is important to reduce losses from optical nodes in the final fibre. For example, in a tube for a six-cell ARF, each straight portion may be in the range of 0.5% to 20% or 0.5% to 25% of the total circumference of the notional circle, for example between 1% and 20%, or between 1% and 10%, or between 10% and 20% or between 5% and 20%. These values are applicable to tubes shaped for other amounts of cells, although a larger number of cells may correspond to a smaller spacing between cladding elements and hence shorter straight portions. In the context of two or more shaped tubes nested in one another (described in more detail below), larger straight portion lengths may be applicable to an outer shaped tube and smaller straight portion lengths to an inner shaped tube. Other values are not excluded, however. A preform may have an actual diameter in a range of about 2 cm to 25 cm or 30 cm (although other diameters might be used). For example, current production preforms for high volume production of standard optical fibre typically have a diameter of about 20 cm. In such a case each straight portion may have a length in the circumferential direction of between about 0.2 cm and 15 cm. Again, these are examples only and other values are not excluded.

Each curved portion 52 comprises an inwardly curving part of the side wall. By "inwardly curving" it is meant that the curved portion is concave from a point of view exterior to the tube, and convex from a point of view in the interior of the tube. A curved portion 52 extends between two ends, each end at a junction with an end of the two adjacent straight portions 54. Typically, the curved shape is symmetrical about a line following the radius of the notional circle which lies at the midpoint between the two adjacent straight portions 54 (although this is not essential and other curved shapes might be utilised to provide more complex cladding structures). The curve of the curved portion 52 can be any smoothly varying shape that presents a negative curvature from the point of view of the axis X, in order to provide the desired negatively curved core boundary in the final ARF. The curved portion 52 extends inwardly to a point closest to the axis X which is separated from the axis X by a distance less than the radius of the nominal circle. In the case of a symmetrical curved portion, this point of closest approach to the axis X lies on the radius of the notional circle at the midpoint between the two adjacent straight portion, in other words the axis of mirror symmetry of the curved shape.

For example, the curve may be a semi-circle, or a semi-ellipse. Alternatively, the curve may be a part of a circumference or perimeter of a circle or an ellipse, in other words, an arc of a circle or an arc of an ellipse, which is less than, or greater than, a semi-circle or a semi-ellipse. Other curved or smoothly varying shapes or profiles may be used in other examples.

In general, therefore, the wall of the tube comprises an alternating sequence of substantially straight minor portions connected to inwardly curving, concave, curved portions, where the number of curved portions is the same as the number of straight portions.

An alternative way to describe the cross-section of the shaped tube is as a quasi-hypocycloid. A hypocycloid is a plane curve generated by the trace of a fixed point on a small circle rolling around the inside of the circumference of a larger circle. For appropriately proportioned circles, this generates a closed shape comprising points or cusps that lie on the circumference of the larger circle, connected by smooth symmetrical inwardly curving portions. The relative sizes of the circles determine the curvature of the curving portions and number of cusps. In the present case, the descriptor "quasi" is added to indicate that the relevant shape of the tube has the same general overall properties as a hypocycloid such that it gives a similar impression to the viewer. However, each of the cusps of the hypocycloid is replaced by the short minor straight portions (being arcs of or tangents to the larger circle), and the curved portions may have shapes/curvatures/profiles different from those determined by a rolling small circle.

A single shaped tube may be used inside an outer jacket tube to create a preform for an ARF similar to that of the FIG. 2 example. The largest external dimensions of the shaped tube, set by the line around which the straight portions lie (the circumference of the nominal circle) or by the distance between two oppositely disposed straight portions (the diameter of the nominal circle), should correspond to or be comparable with the inner dimensions of the cylindrical jacket tube so that the shaped tube can be accommodated inside the jacket tube with contact or near-contact between the outside of the shaped tube at the straight portions and the inside of the jacket tube. This will allow fusing of the two tubes at these points during fabrication of the preform, before the preform is drawn into a cane or a fibre. In other arrangements, fusing of the shaped tube and the jacket tube can take place during drawing. In this case, a tight fit and small separation is less important, since a vacuum applied to the interstitial voids in the cladding to eliminate possible air bubbles also acts to pull the tubes together. A larger spacing can hence be tolerated. Accordingly, under the various regimes, a separation between the jacket tube and the shaped tube may be about 10% or less of the diameter of the jacket tube, for example about 5% or 2%. For contact the separation is substantially zero. These arrangements may be described as contact or near-contact.

Example values of wall thickness for the shaped tube may be in the range of about 0.05 to 0.2 of the shaped tube diameter. The outer jacket tube may be sized such that a ratio of its outer diameter to its inner diameter is the range of 2:1 and 6:1 Other dimensions for the tubes are not excluded.

Alternatively, one or more additional shaped tubes may be inserted inside the jacket tube, so that the shaped tubes lie inside one another in a nested arrangement with their straight portions at the same circumferential positions around the outer jacket tube. Again, the largest dimensions of the tubes should be chosen to give contact or near-contact at the straight portions, for fusing of the tubes.

In order to emulate the double wall effect of the cladding in a NANF with primary and secondary cladding capillaries, such as the FIG. 1(B) example, a second shaped tube can be used with a first shaped tube, where the two tubes have curved portions of differing curvature.

FIG. 5(B) shows a transverse cross-sectional view of a further example shaped tube 51 that may be used in conjunction with the shaped tube of FIG. 5(A). The shaped tube 51 has the same number of straight portions 54 and curved portions 52 as the first shaped tube 50, in this case six, so the two can be used together. The outer diameters/circumferences are substantially the same, subject to a small difference allowing the first tube 50 to be inserted into the second tube 51. However, the curved portions 52 have a shallower, less concave shape than those of the first tube 50. In other words, the amount of inward curvature in the second tube 51 is less than in the first tube 50. The distance from the central longitudinal axis X of the tube 52 to the closest approach of the curved portions 54 to the centre is larger than the corresponding distance in the first tube 51. Accordingly, when the first tube 51 is inserted or nested into the second tube, two glass walls are provided along the radial direction within the extent of each curved portion 52, providing the double air/glass boundary of a NANF with two nested capillaries.

FIGS. 6(A) and 6(B) respectively show perspective views of the first tube 50 and the second tube 51, showing how the shaping of the side walls extends with the same shape along the full length of the tubes 50, 51.

Figure 5:
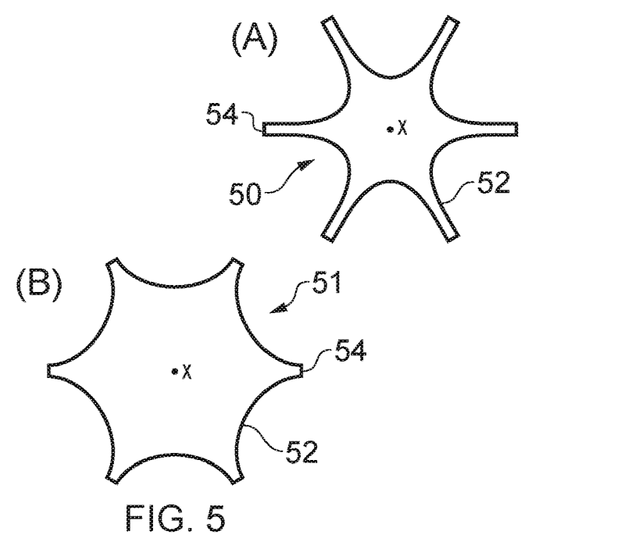
FIGS. 5(A) and 5(B) show transverse cross-sectional views of first and second shaped glass tubes for fabricating optical fibre preforms according to an embodiment.
Figure 6:
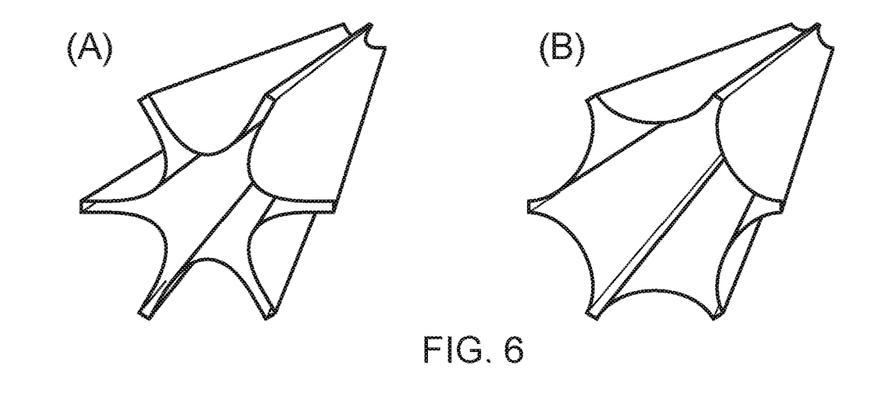
FIGS. 6(A) and 6(B) show perspective views of the shaped glass tubes of FIGS. 5(A) and 5(B)
Figure 7:
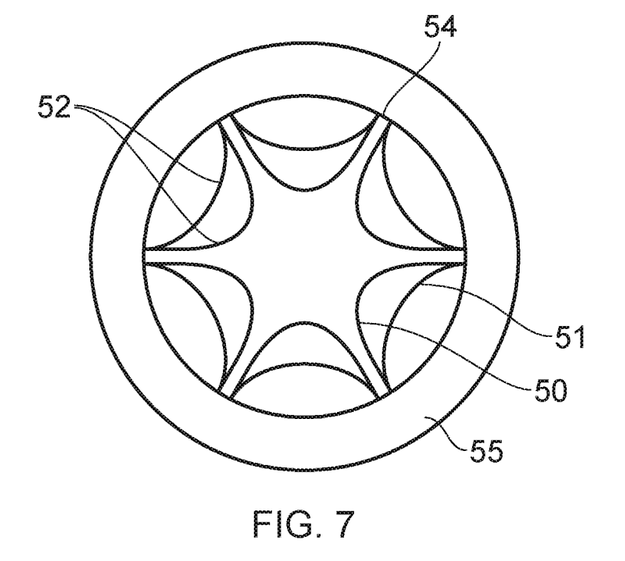
FIG. 7 shows a transverse cross-sectional view of a preform for making an antiresonant hollow core fibre according to an embodiment.

FIG. 7 shows a transverse cross-sectional view through a preform fabricated using shaped tubes of the forms shown in FIGS. 5 and 6. The first tube 50 with the mostly highly concave inwardly curved portions is nested inside the second tube 51 with the less concave inwardly curved portions, which is in turn placed inside a cylindrical glass outer jacket tube 55. The outer surface of the straight portions 54 of the first tube 50 contact the inner surface of the straight portions 54 of the second tube 51, and the outer surface of the straight portions 54 of the second tube 51 contact the inner surface of the jacket tube 55. These aligned straight portions 54 define equal spacings between curved cladding elements 30 formed from the curved portions 52 of the first tube 50 which are the most inwardly positioned curved portions and therefore correspond to the primary capillary tubes of a regular NANF, and the curved portions 52 of the second tube 51 which lie between the first tube 50 and the jacket tube 55 and therefore correspond to the secondary (nested) capillary tubes of a regular NANF.

Note than in the production of optical fibres from a preform to an optical fibre, via an optional intermediate stage known as a cane, the cross-sectional configuration is intended to be substantially maintained. The process of drawing the preform down into the very much smaller diameter fibre merely reduces the cross-sectional size, while the shape is preserved, or modified or controlled slightly by the application of pressure to voids in the structure during the draw. Accordingly, FIG. 7 illustrates any and all of a preform, a cane or an ARF according to embodiments and examples of the disclosure.

Figure 8:
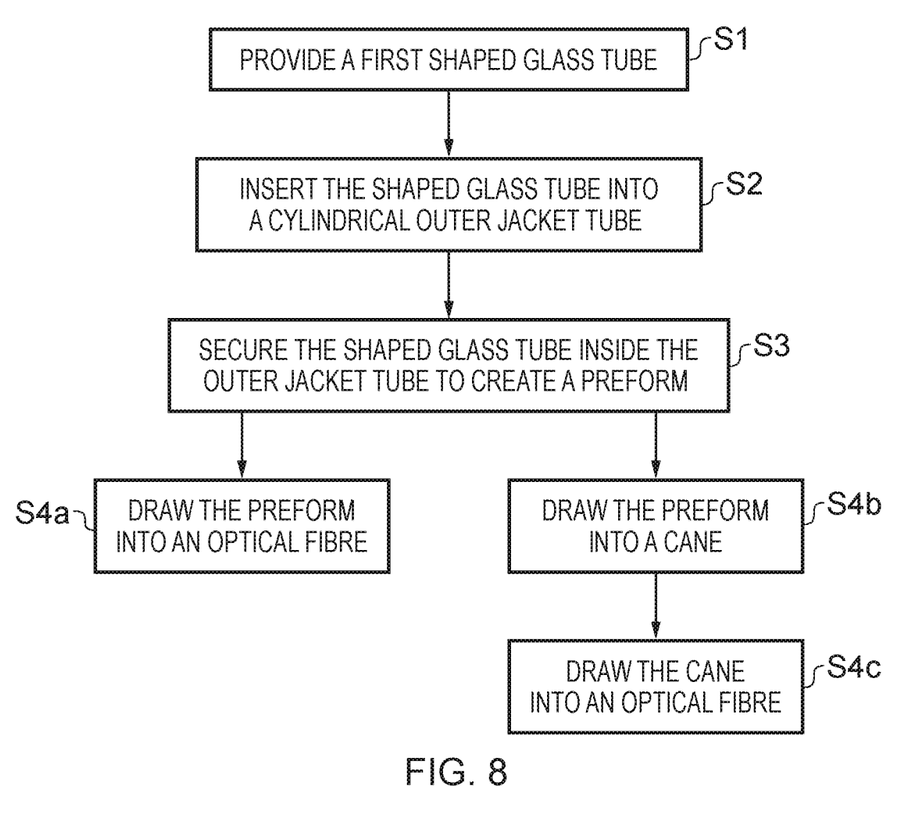
FIG. 8 shows a flow chart of an example method of fabricating an antiresonant hollow core fibre according to an embodiment.

FIG. 8 shows a flow chart setting out steps in a first example method of fabricating an optical fibre preform according to embodiments of the disclosure, plus additional steps for making the preform into a cane or a fibre. In a first step S1, a shaped glass (or polymer) tube having a quasi-hypocycloid cross-section as described above is provided. This provision includes obtaining the shaped tube from an external source or supplier, and the alternative of directly fabricating the shaped tube. Example techniques for tube fabrication are described below. In a second step S2, the shaped glass tube is inserted into a cylindrical outer jacket tube made of glass (or polymer), where the shaped tube and the jacket tube are suitably sized to provide the contact or near-contact described above. The shaped tube and the jacket tube may have the same or similar lengths. For example, the jacket tube may have an outer diameter of about 20 cm, or between 2 cm and 25 cm or between 2 cm and 30 cm. The lengths of the tubes may be in the range of about 20 cm to 100 cm. Other sizes may be used depending on the desired dimensions of the preform.

Then, in step S3, the shaped glass tube is secured inside the outer jacket tube to create an optical fibre preform. The securing can simple or more complex according to preference and the expected amount of future handling of the preform. The shaped glass tube may be fixed to the inside surface of the jacket tube by fusing of the tube materials in the contact areas at the straight portions of the shaped tube. The fusion may be by any known technique such as techniques used in the fabrication of ARF preforms from cylindrical tubes. Fusing may be at a single one of the straight portions, at some of the straight portions, or at all of the straight portions. Fusing may be along the full length of the tubes, or may be at one or more spaced apart locations so as to merely tack the shaped tube in place. Alternatively, the securing may be more simple, and be merely the provision of some arrangement to retain the shaped tube inside the jacket tube when the preform is held in a vertical orientation (as it will be for drawing into a fibre). This is particularly relevant if the relative dimensions of the tubes are such that the fit of the shaped tube inside the jacket tube is relatively close so that once inserted, the shaped tube is not easily able to rotate or slide inside the jacket tube. Also, a close fit allows appropriate bonding or fusing of the tubes to one another to take place within the process of heating and drawing the preform into a fibre, without any need for an initial bonding stage. For example, a simple securing step to create the preform may comprise the jacket tube having a restricted or closed aperture at one end, with the shaped tube being inserted via the other end of the jacket tube. The aperture may be restricted after insertion of the shaped tube, by heating the glass of the jacket tube to soften it, and then pinching its side wall or bending it inwards, for example. Also, some form of separate closure or restricting element may be fastened over the end of the jacket tube. In these cases, the shaped tube may remain free to move inside the jacket tube. However, since the spacing and relative positions of the various cladding elements are set by the unitary nature of the shaped tube, any such movement such as rotation relative to the jacket tube will not modify the relative positions of the elements and the intended configuration for the final fibre is not lost.

Hence, it can be appreciated that preform fabrication for ARF manufacture is simplified compared to the assembly of multiple circular tubes according to known techniques. At its simplest, the proposed method requires only two tubular elements to be assembled together. The relative positions of the cladding elements are set by the structure of the shaped tube so that the effort of correctly locating various tubes relative to one another is removed. Also, the use of spacers and similar additional elements that may be used to pack a stack of circular tubes inside a jacket tube in order to maintain the required relative positions is not required.

The preform produced in step S3 may be, either immediately following step S3 or at some later time, made into an optical fibre using known fibre fabrication techniques. The preform may be drawn down directly into a fibre in step S4a. Alternatively, in step S4b the preform may be drawn into a cane of intermediate diameter between the preform and the intended fibre, and the cane may then be drawn into the final fibre in step S4c. In either case, typically the fibre drawing process (step 4a or step 4c) includes the jacketing of the preform or the cane with an outer glass tube before drawing, in order to provide sufficient glass material for the finished fibre.

Figure 9:
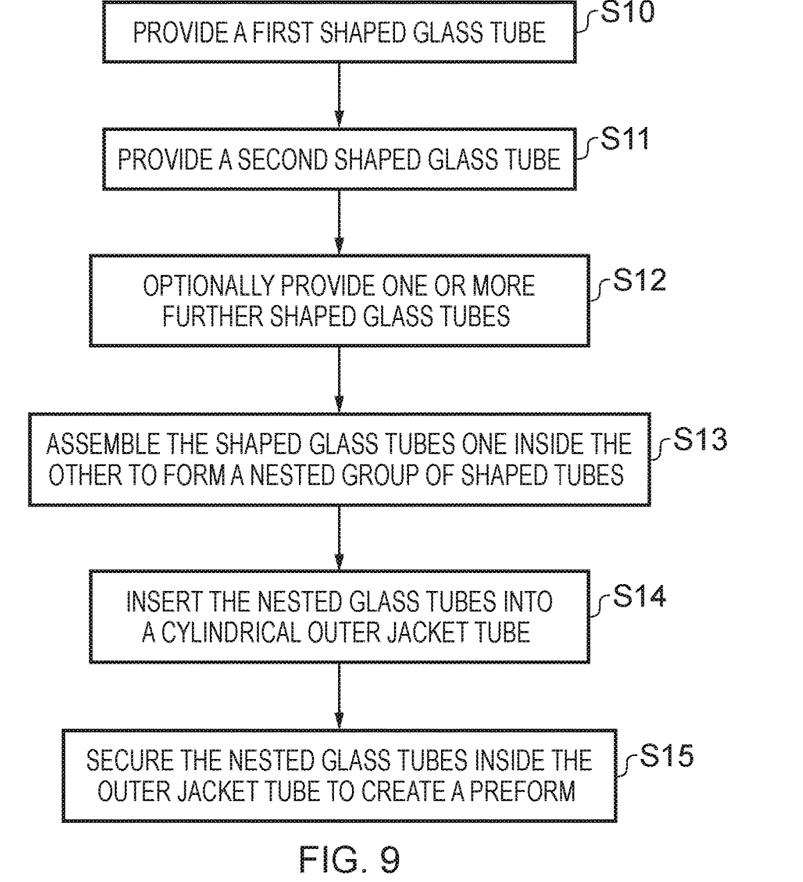
FIG. 9 shows a flow chart of an example method of fabricating a preform for making an antiresonant hollow core fibre according to a further embodiment.

FIG. 9 shows a flow chart setting out steps in a second example method of fabricating an optical fibre preform according to embodiments of the disclosure. In step S10, a first shaped glass (or polymer) tube is provided (by procurement or fabrication) as in the FIG. 8 method. In step S11, a second shaped glass (or polymer) tube, with a different curvature of the curved portions, is provided. In step S12, one or more further shaped glass (or polymer) tubes, with further different curvatures, are optionally provided, according to the number of nested NANF elements which are intended to be emulated in the structure of the finished fibre. Each additional shaped tube provides an extra membrane layer and hence an extra air/glass interface in the cladding along the radial direction. Each shaped tube has the same number of curved portions.

In step S13, the shaped glass tubes are inserted inside one another to form a nested group or array, with the tube having the highest curvature (maximum concavity) of the curved portions in the innermost position, and decreasing curvature amounts moving outwardly through the nested group. In step S14, the nested group is inserted inside a cylindrical outer jacket tube. As an alternative to steps S13 and S14, the shaped tubes may be inserted into the outer jacket one at a time, rather than being assembled into a group first. The procedures are equivalent.

In step S15, the nested glass tubes are secured inside the outer jacket to create the required preform (which may then be drawn into a fibre via steps corresponding to the either of the alternatives S4a and S4b/S4c of FIG. 8). The securing may be as described for step S3 in FIG. 8. The securing may be applied in a single step to hold each of the shaped tubes in place inside each other and inside the jacket tube. Alternatively, some securing of the shaped tubes to one another may be applied to the nested group made in step S13 before the nested group is inserted into the jacket tube in step S14. In such a case the securing in step S15 is carried out to secure the nested group as a whole to the jacket tube.

Any number of shaped tubes may be employed, depending on the complexity of the cladding structure which is desired. Typically an optical fibre preform can have a diameter of about 20 cm (other sizes can be used), so there is significant space available inside the outer jacket tube to accommodate multiple shaped tubes if desired. The preform may include one, two, three, four, five or more than five shaped tubes, although one, two or three tubes may be the most useful configurations.

Figure 10:
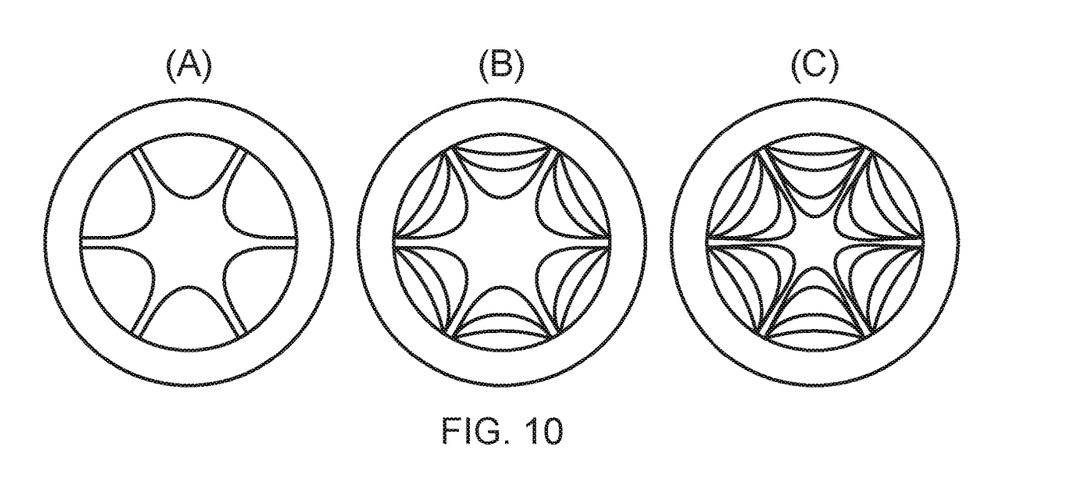
FIGS. 10(A), 10(B) and 10(C) show transverse cross-sectional view of preforms for making antiresonant hollow core fibres according to further embodiments.

FIG. 10(A) shows a cross-sectional view of a preform having one shaped tube for defining a core region, FIG. 10(B) shows a cross-sectional view of a preform having three shaped tubes for defining a core region, and FIG. 10(C) shows a cross-sectional view of a preform having four shaped tubes for defining a core region.

A variety of methods are proposed for the fabrication of the shaped tubes.

A first example method for shaped tube fabrication is the use of shaped formers to reform cylindrical glass tubes into the required shape.

Figure 11:
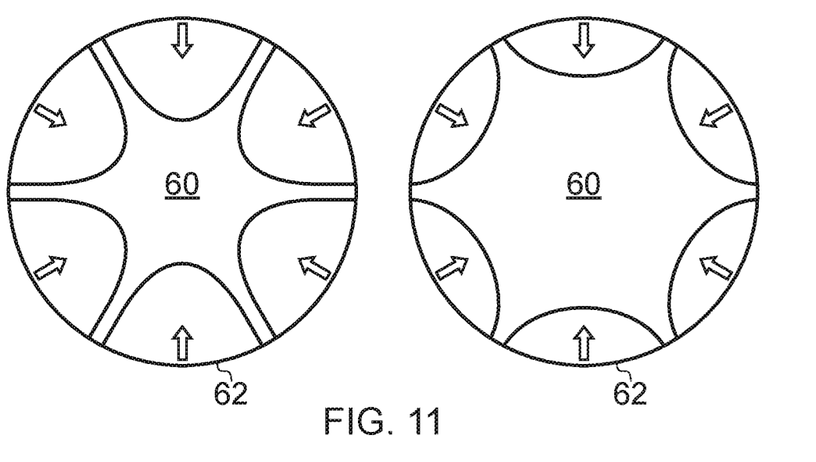
FIG. 11 shows a simplified schematic representation of apparatus for making shaped glass tubes according to an embodiment.

FIG. 11 shows a simplified schematic representation of example apparatus suitable for implementing such a method. The left side of FIG. 11 shows the formation of a shaped tube corresponding to the example of FIG. 5(A) and the right side shows the formation of a shaped tube corresponding to the example of FIG. 5(B). A former 60 is provided for each size and shape of shaped tube which is required. The outer surface of the former 60 is shaped to correspond to the desired cross-section of the shaped tube. The former 60 is made from a suitable material able to withstand the high temperatures required for reforming glass, such as graphite, vitreous carbon, glassy carbon, boron nitride or aluminium nitride. Also, the former 60 is sized to take account of expansion during heating so that its size when heated corresponds to the desired size of the shaped tube, also taking into account shrinkage of the glass tube as it cools after reforming.

A cylindrical glass tube 62, possibly from a commercial source, and with a diameter closely conforming to the width of the former 60, is provided, and sleeved over the former 60. The assembly of former 60 and tube 62 is heated in order to soften the glass tube and make it able to be deformed. While the glass is in a softened state, a vacuum (or reduced pressure) is applied to the space(s) between the former 60 and the glass tube 62. The reduction in pressure allows the softened glass of the tube 62 to be pulled inwards, indicated by the arrows, until it rests against the surface of the former 60, thereby acquiring the outer shape of the former 60. The assembly is allowed to cool. If the former material is selected such that the coefficient of thermal expansion of the former 60 is higher than the coefficient of thermal expansion of the glass, the former 60 will shrink more on cooling than the reformed glass tube. Thus, the former 60 is able to be removed from inside the now shaped tube once cooling has taken place.

A second example method for shaped tube fabrication is the deposition of glass soot. This is a technique which is commercially employed for the high volume manufacture of glass tubes, glass preforms and optical fibres. Outside vapour deposition using flame hydrolysis can be used.

Figure 12:
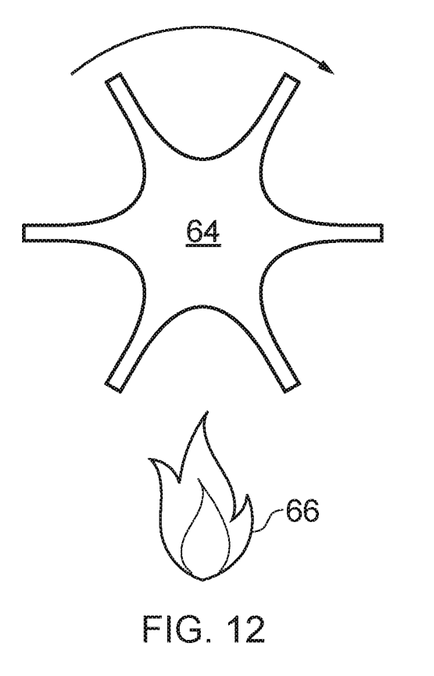
FIG. 12 shows a simplified schematic representation of apparatus for making shaped glass tubes according to another embodiment.

FIG. 12 shows a simplified schematic representation of example apparatus suitable for implementing such a method. A mandrel 64 is provided, with an outer surface shaped and sized to correspond to the desired shape of the shaped tube. Flame hydrolysis employing oxyhydrogen flames 66 carrying appropriate chemical agents for the desired composition of the glass of the shaped glass tube is used to deposit glass soot onto the outside surface of the mandrel as it rotates relative to the flame position. After an appropriate deposition time, a white shaped tube of glass soot is created on the mandrel. The tube is then heated in a furnace to sinter the soot, which causes the soot to consolidate and become transparent and also purified as any impurities from the deposition are driven off.

A third example method for shaped tube fabrication is extrusion.

This is a known technique for the manufacture of preforms which are made from relatively soft and low melting temperature glass materials. Glass billets are heated to above their glass transition temperature (melting temperature), and pushed through an appropriately shaped die using high pressure in order to acquire the desired cross-sectional shape. This is currently challenging for fused silica because its glass transition temperature is high, and there is a difficulty in providing dies able to withstand this temperature. However, it may become possible with future improvements in high temperature composite materials. The method is certainly already suitable for glasses with lower glass transition temperatures, such as lead silicates, tellurites, germanates and chalcogenides.

A fourth example method for shaped tube fabrication is three-dimensional (3D) printing.

A first type of 3D printing uses a filament of material which is pushed through a nozzle in order to "write" a first layer of the desired object onto a substrate, which moves in a plane perpendicular to the nozzle to trace the desired shape. The substrate is then shifted further away from the nozzle and the process repeated in order to build up the object layer by layer.

A second type of 3D printing uses a bed of dust of the required material for the object to be printed. A first layer of the object is formed by applying a laser beam to the dust in order to sinter it. Then a further layer of dust is provided which is sintered in turn, in order to build up the object layer by layer.

While materials such as plastics, metals and ceramics are commonly used for 3D printing, the processes are starting to be applicable to glass materials, and it is expected that silica will be able to be shaped using 3D printing in due course.

The shaped tube or tubes and the outer jacket tube used to make preforms and subsequently optical fibres as described herein may be made from any of the materials known for the fabrication of existing designs of antiresonant hollow core fibre, including glass materials such as silica, and polymer materials. The various shaped tubes and the outer jacket tube in a single preform or fibre may be made from the same material or from different materials. Types of glass include "silicate glasses" or "silica-based glasses", based on the chemical compound silica (silicon dioxide, or quartz), of which there are many examples. Other glasses suitable for optical applications include, but are not limited to, chalcogenides, tellurite glasses, fluoride glasses, and doped silica glasses. The materials may include one or more dopants for the purpose of tailoring the optical properties, such as modifying absorption/transmission or enabling optical pumping.

Note that the curvature given to the curved portions of a shaped glass tube during fabrication of the tube is not critical having regard to the intended curvatures of the cladding elements in the final optical fibre. Known fibre drawing techniques for making hollow core fibres include the application of one or more pressures to the interiors of various capillaries or groups of capillaries within a preform during drawing, in order to control and tailor the cross-sectional size and shape of the voids or cavities defined by these capillaries in the finished fibre. This can be used in the present case also in order to define the size and shape of the various hollow spaces in the curved cladding elements. Hence a requirement for the shaped glass tubes is simply that if more than one shaped glass tube is included, the curved portions have different amounts of curvature in order to define the required hollow spaces between the radially separated glass walls or membranes.

Alternatively, the hollow space between two radially separated glass membranes may be defined by shaped tubes which have curved portions of effectively the same curved shape, but of different length, so the curved portions have a different size. The curved shape is the same but the radius of curvature at any point is different between the two curved portions. Hence the curved portions have corresponding shapes but are on a different scale. In other words, the two curved portions are effectively parallel to one another, and have junctions of their end points with the inside of the jacket tube which are at different locations.

Figure 13:
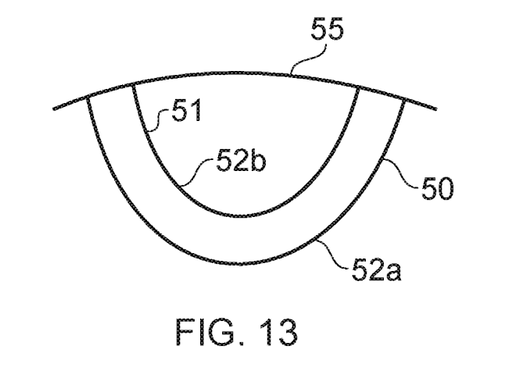
FIG. 13 shows a transverse cross-sectional view of parts of two shaped glass tubes defining a cladding element according to different embodiment.

FIG. 13 shows a cross-sectional view of an example of a pair of curved portions from two nested shaped tubes which are curved in this way. An inner curved portion 52a of an inner shaped tube 50 forms part of the core boundary, and is parallel with an outer curved portion 52b of an outer shaped tube 51, which lies between the inner curved portion and the inner surface of the jacket tube 55. Compare this with FIG. 7, for example, where the curved portions have different curved shapes and are hence not parallel to one another, but do meet the jacket tube at the same junction locations. In still other examples, the curved portions might have different curved shapes (and are hence not parallel) and also different junction locations.

Although the shaped tubes have been described as having straight portions between the curved portions in order to provide the cladding element spacing required in a nodeless ARF, shaped tubes may also be configured for the fabrication of ARFs without such spacing. A shaped tube may lack any straight portions in its side wall, and instead comprise a sequence of curved portions that connect together at points or cusps around the perimeter, as in a hypocycloid.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] TD Bradley, J R Hayes, Y Chen, G T Jasion, S R Sandoghchi, R Slavik, E N Fokoua, S Bawn, H Sakr, I A Davidson, A Taranta, J P Thomas, M N Petrovich, D J Richardson, F Poletti, "Record Low-Loss 1.3 dB/km Data Transmitting Antiresonant Hollow Core Fibre" in Proc European Conference on Optical Communications (ECOC) 2018, paper Th3F2
[2] Francesco Poletti, "Nested antiresonant nodeless hollow core fiber," Opt. Express 22, 23807-23828 (2014)
[3] WO 2015/185761
[4] L. D. van Putten et al., "Exploring the Effect of the Core Boundary Curvature in Hollow Antiresonant Fibers," IEEE Photonics Technology Letters 29(2), 263-266 (2017)
[5] US 2016/0124144

The invention claimed is:

1. A shaped tube for use as a component in the fabrication of an antiresonant hollow core optical fibre, the shaped tube having a side wall with a transverse cross-sectional shape comprising a number of major curved portions alternating with the same number of minor substantially straight portions, each curved portion having an inwardly curving shape, and each straight portion being equidistant from a central longitudinal axis of the shaped tube.

2. The shaped tube according to claim 1, in which the inwardly curving shape is symmetrical about a radius from the central longitudinal axis to a midpoint between two straight portions one either side of the curved portion.

3. The shaped tube according to claim 2, in which the inwardly curving shape is a semi-circle, a semi-ellipse, an arc of a circle or an arc of an ellipse.

4. The shaped tube according to claim 1, in which each curved portion has the same inwardly curving shape.

5. The shaped tube according to claim 1, in which each curved portion has the same separation from the central longitudinal axis.

6. The shaped tube according to claim 1, in which the number of curved portions is in the range of from two curved portions to twelve curved portions.

7. The shaped tube according to claim 1, in which the shaped tube is formed from a glass material or a polymer material.

8. The preform for an antiresonant hollow core optical fibre, comprising a shaped tube according to claim 1 secured inside an outer jacket tube of glass material or polymer material such that the straight portions of the shaped tube are in contact or near-contact with an inner surface of the outer jacket tube.

9. The preform according to claim 8, further comprising at least one additional shaped tube in a nested arrangement with the said shaped tube, each of the shaped tubes having curved portions with a different inwardly curving shape and/or a different length from the curved portions of the other shaped tube or tubes, and each of the shaped tubes having the same number of curved portions.

10. The cane for an antiresonant hollow core optical fibre drawn from a preform according to claim 8.

11. The antiresonant hollow core optical fibre drawn from a preform according to claim 8.

12. The method of fabricating a preform for an antiresonant hollow core optical fibre comprising:
providing a shaped tube according to claim 1;
inserting the shaped tube into an outer jacket tube of glass material or polymer material such that there is contact or near-contact between the straight portions of the shaped tube and an inner surface of the outer jacket tube; and
securing the shaped tube inside the outer jacket tube.

13. The method according to claim 12, further comprising:
providing at least one additional shaped tube where each of the shaped tubes has curved portions with a different inwardly curving shape from the curved portions of the other shaped tubes or tubes, and the same number of curved portions; and
inserting the shaped tubes into one another to provide a nested group of shaped tubes inside the outer jacket tube.

14. The method of fabricating a cane for an antiresonant hollow core optical fibre, comprising fabricating a preform according to the method of claim 12, and drawing the preform into a cane.

15. The method of fabricating an antiresonant hollow core optical fibre, comprising fabricating a preform according to the method of claim 12, and drawing the preform into an optical fibre.

16. The method according to claim 12, in which providing the shaped tube or tubes comprises fabricating the or each shaped tube by heating and reforming a cylindrical glass tube over a former with an outer shape corresponding to the desired cross-sectional shape of the shaped tube.

17. The method according to claim 12, in which providing the shaped tube or tubes comprises fabricating the or each shaped tube by depositing glass soot onto a rotating mandrel with an outer shape corresponding to the desired cross-sectional shape of the tube to form a shaped tube of glass soot, and sintering the shaped tube of glass soot to form a shaped tube of consolidated glass material.

18. The method according to claim 12, in which providing the shaped tube or tubes comprises fabricating the or each shaped tube by extruding molten glass through a die shaped to correspond to the desired cross-sectional shape of the shaped tube.

19. The method according to claim 12, in which providing the shaped tube or tubes comprises fabricating the or each shaped tube using three-dimensional printing.

20. A nested antiresonant nodeless hollow core optical fibre, or a preform or a cane for drawing into a nested antiresonant nodeless hollow core optical fibre, comprising:
  a cylindrical elongate outer jacket of glass material or polymer material;
  a cladding structure comprising a plurality of cladding elements of glass material or polymer material spaced apart around an inner surface of the outer jacket and defining elongate cladding voids, each cladding element comprising a first inwardly curving wall extending from the inner surface towards a central longitudinal axis of the outer jacket and back to the inner surface along a first curved shape, and a second inwardly curving wall extending from the inner surface towards the central longitudinal axis and back to the inner surface along a second curved shape which has a different shape and/or a different length from the first curved shape; and
  an elongate hollow core region along the central longitudinal axis and bounded by negative curvatures of the first inwardly curving walls of the cladding elements.

21. The antiresonant hollow core optical fibre, a preform or a cane according to claim 20, in which each cladding element further comprises one or more additional inwardly curving walls extending from the inner surface towards the central longitudinal axis and back to the inner surface along a curved shape different in shape and/or length from the first curved shape and the second curved shape.

* * * * *